(12) United States Patent
Han et al.

(10) Patent No.: US 7,537,625 B2
(45) Date of Patent: May 26, 2009

(54) MULTI CYCLONE DUST SEPARATING APPARATUS

(75) Inventors: Jung-gyun Han, Gwangju (KR); Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 603 days.

(21) Appl. No.: 11/372,814

(22) Filed: Mar. 10, 2006

(65) Prior Publication Data

US 2006/0230725 A1     Oct. 19, 2006

Related U.S. Application Data

(60) Provisional application No. 60/666,092, filed on Mar. 29, 2005.

(30) Foreign Application Priority Data

May 11, 2005    (KR)  ..................... 10-2005-0039378

(51) Int. Cl.
    *B01D 45/12*       (2006.01)
(52) U.S. Cl. .............................. 55/343; 55/346; 55/348; 55/429; 55/457; 55/459.1; 55/DIG. 3
(58) Field of Classification Search .................... 55/343, 55/346, 348, 429, 457, 459.1, DIG. 3; 15/350, 15/353
See application file for complete search history.

(56) References Cited

U.S. PATENT DOCUMENTS

2002/0043055 A1    4/2002    Conrad ........................ 55/337

2005/0050864 A1 *   3/2005    Oh et al. ...................... 55/345
2005/0050865 A1     3/2005    Oh et al. ...................... 55/345

FOREIGN PATENT DOCUMENTS

GB        835884       5/1960
GB       2360719 A     3/2001

OTHER PUBLICATIONS

Extended Search Report dated Jun. 29, 2007 issued from the European Patent Office for the corresponding Patent Application No. 06290377.8-2316.

* cited by examiner

*Primary Examiner*—Robert A Hopkins
(74) *Attorney, Agent, or Firm*—Ohlandt, Greeley, Ruggiero & Perle, L.L.P.

(57) ABSTRACT

A multi cyclone dust separating apparatus including a first cyclone and a second cyclone having a plurality of cyclones formed on an outer side of the first cyclone. The first cyclone includes a first cyclone chamber centrifugally separating dust from air, a chamber outer wall, a first inlet and a first outlet forming the first cyclone chamber. The second cyclone unit includes a plurality of cyclones arranged along an outer circumference of the first chamber outer wall, and having a second cyclone chamber centrifugally separating minute dusts from air drawn in from the first cyclone unit, a second chamber outer wall forming the second cyclone chamber, second inlet, and a second outlet. The second inlet of each second cyclone of the second cyclone unit is lower than the first inlet of the first cyclone unit and freely settable.

8 Claims, 4 Drawing Sheets

MULTI CYCLONE DUST SEPARATING APPARATUS

CROSS-REFERENCE TO RELATED APPLICATIONS

Figure 1:
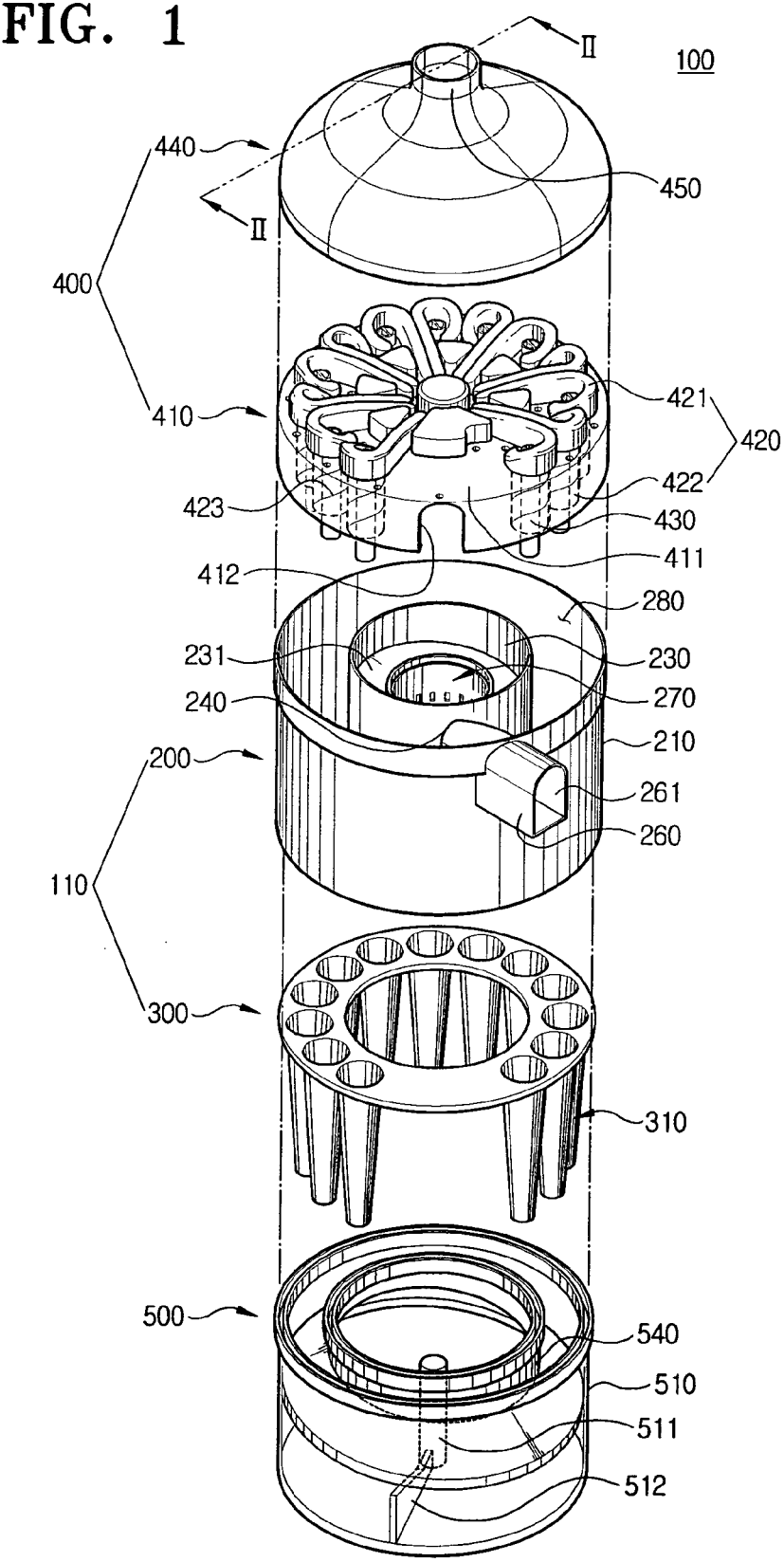

This application claims benefit under 35 U.S.C. § 119(a) of Korean Patent Application No. 2005-39378, filed May 11, 2005, in the Korean Intellectual Property Office and claims benefit of U.S. provisional application No. 60/666,092, filed Mar. 29, 2005 in the U.S. Patent and Trademark Office, the entire contents of both of which are incorporated herein by reference.

BACKGROUND OF THE INVENTION

1. Field of the Invention

The present invention relates to a dust separating apparatus employed for a vacuum cleaner. More particularly, the present invention relates to a multi cyclone dust separating apparatus, which utilizes centrifugation to separate dust from air flowed in the vacuum cleaner through multi steps.

2. Description of the Related Art

Generally, vacuum cleaners include a suction brush that draws in dust from a surface to be cleaned, a dust separating apparatus that separates dust from air drawn in through the suction brush, and a suction motor that generates a suction force. Conventional dust separating apparatuses which are mainly employed utilize a dust filter that requires inconvenient and frequent replacements and also creates an unsanitary condition. Recently, cyclone dust separating apparatuses are being widely used. These apparatuses are beneficial in that they do not have a dust filter and, therefore, they can be used for long periods of time. Cyclone dust separating apparatuses utilize centrifugation to separate and collect dust from the air.

Due to the structure and performance of cyclone dust separating apparatuses, they may fail to separate and collect dust particles of minute size. Recently, an enhanced cyclone dust separating apparatus has been developed that improves upon collecting and filtering minute dust particles in air through a two step methodology. One example is a multi cyclone dust separating apparatus (Patent No. 2003-62520) applied by this applicant. This multi cyclone dust separating apparatus includes a plurality of second cyclones that are disposed on an outer circumference of a first cyclone. This results in a significant enhancement in collecting dust particles of minute size. However, the multi cyclone dust separating apparatus is still unable to completely remove minute dust. Accordingly, studies are currently underway on way to improve the efficiency of collecting minute dust particles.

SUMMARY OF THE INVENTION

An aspect of the present invention is to solve the above problems and/or disadvantages of the related art and to provide the advantages described below. Accordingly, an aspect of the present invention is to provide a multi cyclone dust separating apparatus that increases the rotary force of air drawn into second cyclones. This apparatus has improved designed structures based on the shape of the vacuum cleaner and the cyclone dust separating apparatus.

In order to achieve the above-described aspects of the present invention, a multi cyclone dust separating apparatus is provided that includes a first and second cyclone unit, a cover unit, and a dust collecting unit. The first cyclone unit comprises: a housing; a first cyclone chamber utilizing centrifugation to separate dust particles from air that is externally drawn in; a chamber outer wall forming the first cyclone chamber; a first inlet; and a first outlet. The second cyclone unit comprises a plurality of cyclones arranged along an inner circumference of the housing so that minute dust particles may be separated by centrifugation from air that is drawn in from the first cyclone unit. Respective cyclones include a second cyclone chamber, a second chamber outer wall, a second inlet, and a second outlet forming the second cyclone chamber. The cover unit is mounted at the upper sides of the first and second cyclone units so that air discharged from the first cyclone unit is guided to the second cyclone unit and is discharged from the second cyclone unit into the outside. The dust collecting unit collects dust separated from the air in the first and second cyclone units. The second inlet of each cyclone of the second cyclone unit is lower than the first inlet of the first cyclone unit.

A part of at least one cyclone of the second cyclone unit is inserted into the dust collecting unit.

At least one cyclone of the second cyclone unit is completely inserted into the inside of the dust collecting unit.

The cover unit includes an air guide path allowing and rotarily inducing the air discharged from the first outlet of the first cyclone unit to each second inlet of the plurality of cyclones, a first cover having an outlet guide path to be fluidly communicated with the second outlets of the cyclones, a the second cover combined to cover the first cover and having a discharge pipe combining air exhausted from the plurality of out let guide paths and externally discharging the combined air.

The air guide path has horizontal parts radially disposed with reference to a center of the first cover, and vertical parts extending downwards by a predetermined length, such that one end is fluidly communicated to the horizontal parts and the other end is fluidly communicated to the second inlet of the respective cyclones.

The outlet guide path penetrates the inside of the vertical parts of the air guide path.

An air inducing member is formed inside the vertical parts, helping the air let in through the horizontal parts to descend, while maintaining rotary current, and lead into the second inlet of the cyclone.

The air inducing member is mounted on an outer circumference of the outlet guide path.

BRIEF DESCRIPTION OF THE DRAWING FIGURES

Figure 2:
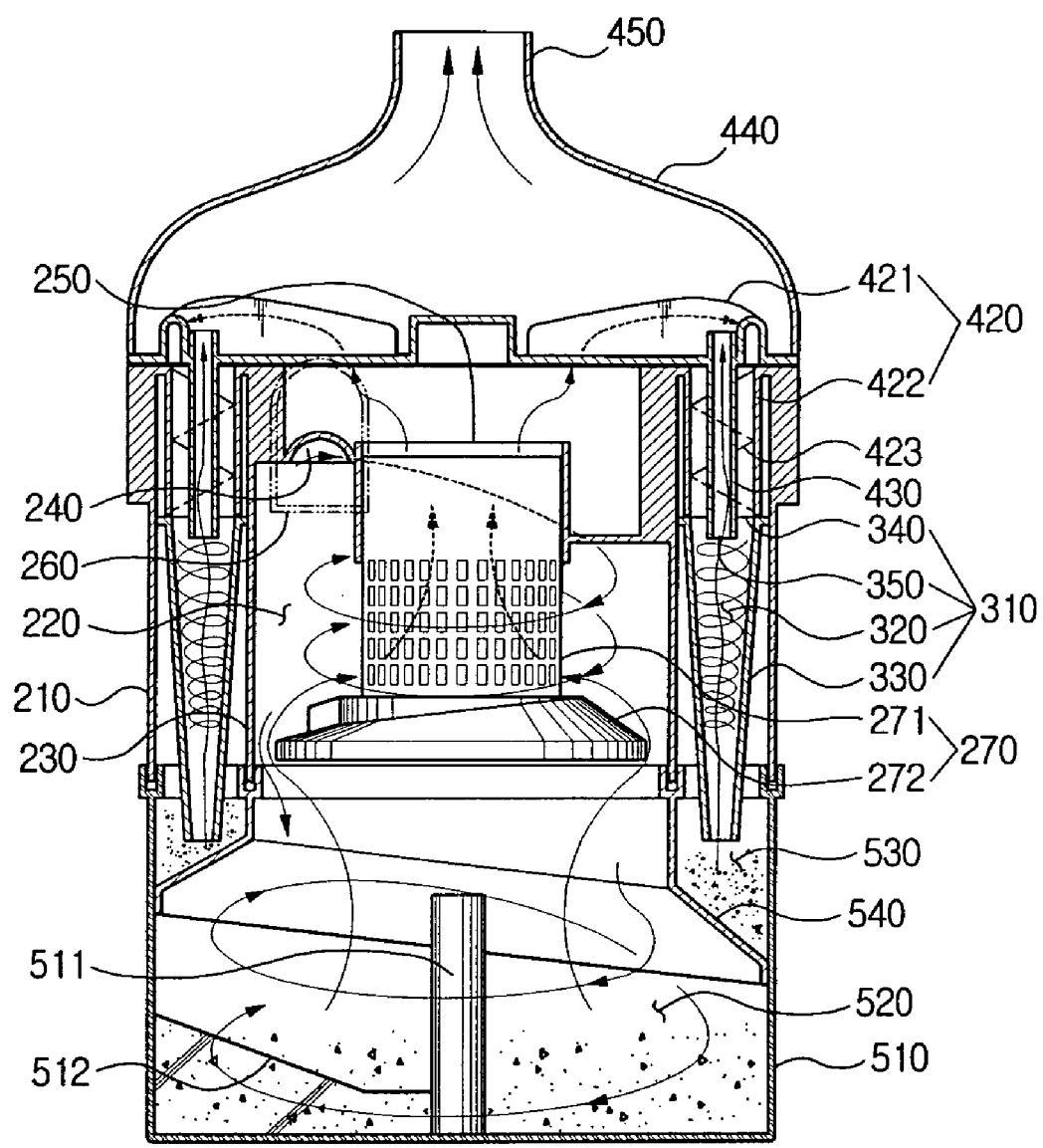
Figure 3:
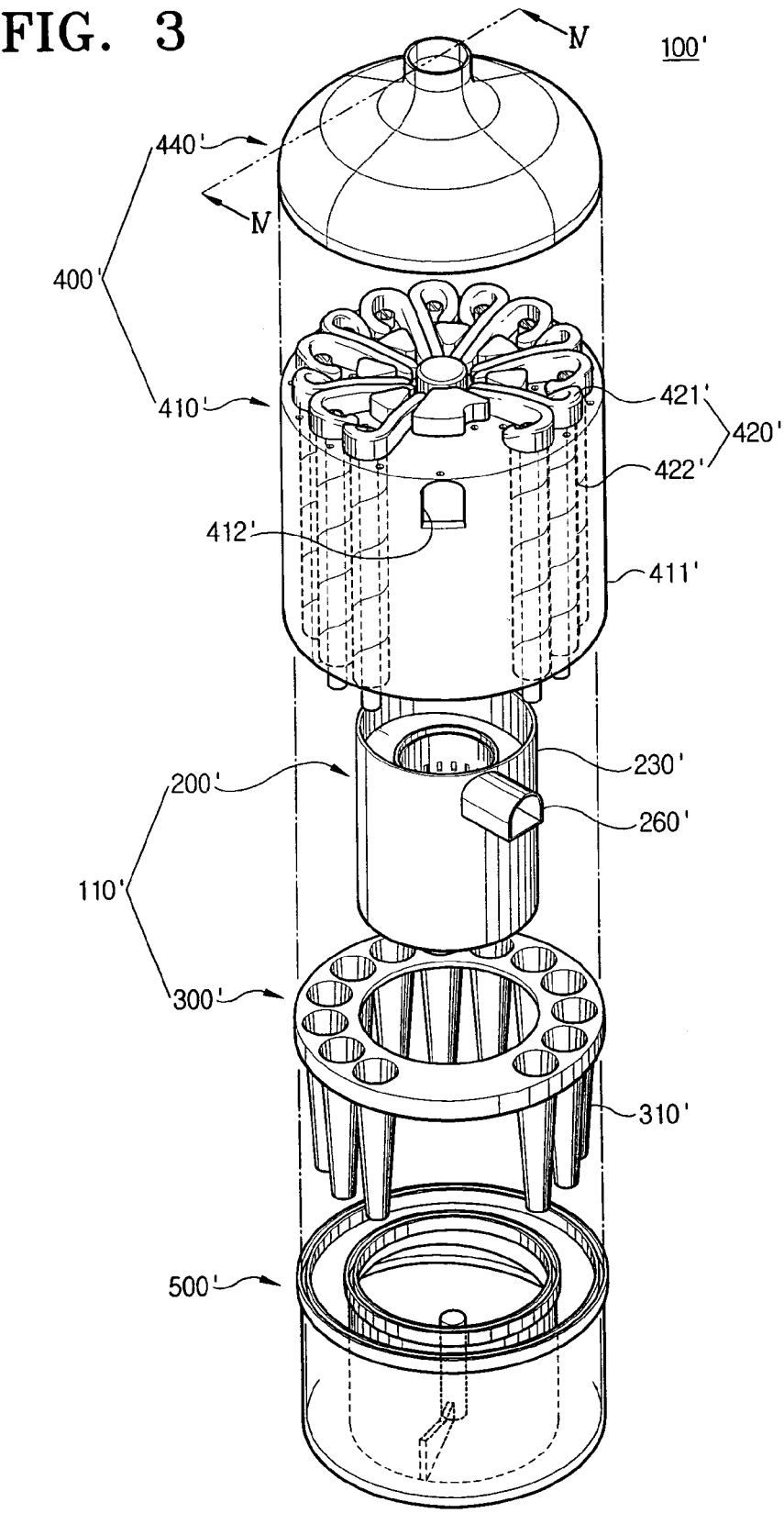
Figure 4:
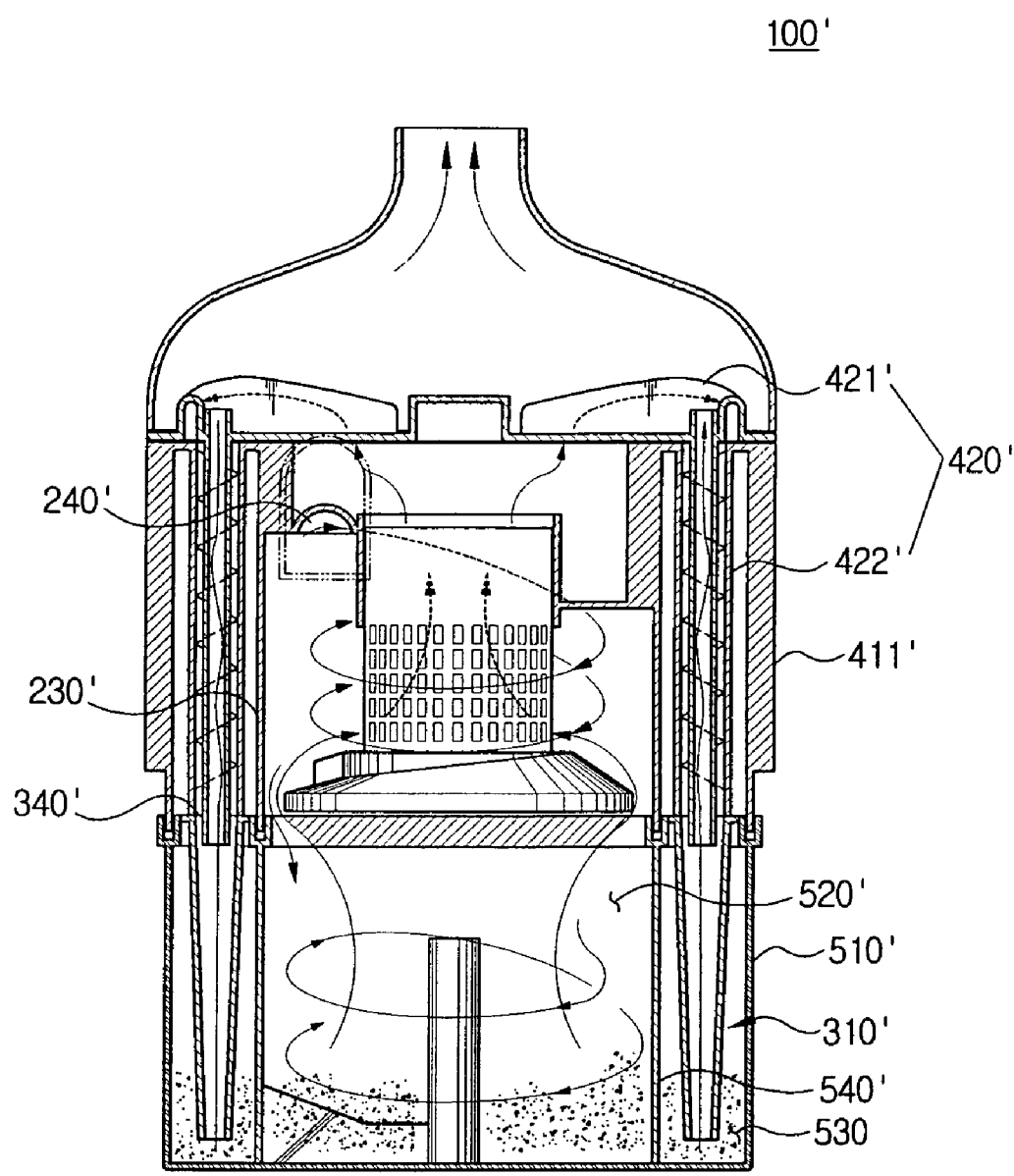

The above aspect and other features of the present invention will become more apparent by describing in detail exemplary embodiments thereof with reference to the attached drawing figures, wherein;

FIG. 1 is a separated perspective diagram of a multi cyclone dust separating apparatus according to one embodiment of the present invention, FIG. 2 is a sectional view in a viewpoint of II-II line of FIG. 1, FIG. 3 is a separated perspective diagram of a multi cyclone dust separating apparatus according to another embodiment of the present invention, and FIG. 4 is a sectional view in a viewpoint of IV-IV of FIG. 3.

DETAILED DESCRIPTION OF THE EXEMPLARY EMBODIMENTS

Hereinafter, an embodiment of the present invention will be described in detail with reference to the accompanying Figures.

In the following description, reference numerals are used for the same elements in different drawings. The matters defined in the description are provided to assist in a comprehensive understanding of the invention. Thus, it is apparent that the present invention can be carried out without those defined matters. Also, well-known functions or constructions are not described in detail since they would obscure the invention in unnecessary detail.

Referring to FIGS. 1 and 2, a multi cyclone dust separating apparatus 100 is shown that comprises a cyclone unit 110, a cover unit 400 combined to an upper side of the cyclone unit, and a dust collecting unit 500 that is combined to a lower side of the cyclone unit.

Cyclone unit 110 comprises a first cyclone unit 200 and a second cyclone unit 300, which has a plurality of cyclones 310.

First cyclone unit 200 comprises a housing 210 that forms a substantially cylinder-shaped appearance; a first chamber outer wall, mounted to the inside of housing 210, which forms a first cyclone chamber; suction pipe 260 which draws air into the inside of first cyclone chamber 220; and grill member 270 which connects to an upper part of first chamber outer wall 230.

First chamber outer wall 230 has a substantially cylindrical shape, similar to housing 210. Space part 280 is formed between housing 210 and first chamber outer wall 230. Inserted into space part 280 are part of an air guide path 420, discharge guide path 430 of a cover unit, and part of second cyclone unit 300.

First chamber outer wall 230 has a lower side that is open and an upper part that opens through first outlet 250. Formed at first chamber outer wall 230 is first inlet 240 connected to suction part 260. First outlet 250 is smaller than the inside diameter of first chamber outer wall 230. Air inducing wall 231 is formed at an inner part of first chamber outer wall 230. Air inducing wall 231 is shaped in a spiral manner so that it gradually narrows for a predetermined distance toward the circumference from the outer side of first outlet 250. Accordingly, the air drawn in through first inlet 240 is guided by air inducing wall 231 and forms a rotary air current that is let into first cyclone chamber 220.

Suction pipe 260 guides dust entrained air into first cyclone chamber 220. Suction pipe 260 penetrates housing 210 and is extended to first chamber outer wall 230. Entry 261 is formed at the outer side of suction pipe 260 and is noncircular pipe shaped. Suction pipe 260 gradually guides air drawn in through entry 261 downwards.

Grill member 270 prevents relatively large dust particles, that have been separated by centrifugation in first chamber outer wall 230, from being counterflowed and let out through first outlet 250. Grill member 270 has grill body 271 formed with a plurality of minute holes and a skirt combined to a lower side of the grill body. Grill body 271 has a cylindrical shape and has an open upper side. The upper side of grill body 271 is connected to first outlet 250. The lower side of grill body 271 is closed and is connected to skirt 272. Skirt 272 prevents dusts centrifugally separated in first cyclone chamber 220 from being counterflowed.

Second cyclone unit 300 includes a plurality of cyclones 310 having the upper part inserted into the space part 280 and the lower side inserted into dust collecting unit 500 (Refer to FIG. 2). The plurality of cyclones 310 are formed at an outer side of first chamber outer wall 230 in predetermined intervals. That is, cyclones 310 are formed around the outer circumference of first chamber outer wall 230, excerpt for the lower side of suction pipe 260.

Plurality of cyclones 310 includes second cyclone chamber 320, second chamber outer wall 330, second inlet 340, and second outlet 350. Second chamber outer wall 330 is reverse cone shaped in such a manner that the diameter narrows as it goes downwards. A predetermined part of one end is severed. The upper and lower sides of second chamber outer wall 330 are open. In cyclone chamber 320, dust entrained air descends while forming a rotary air current. The dust in the air is centrifugally separated and flows out the lower side of second chamber outer wall 330.

The upper side of second chamber outer wall 330 opens into second inlet 340. Air that is discharged from first cyclone chamber 220 is drawn into second chamber outer wall 330. The air is then discharged from second cyclone chamber 320 through second outlet 350 having been centrifugally separated.

Second inlet 340 of plurality of cyclones 310 is not the same as first inlet 240 of the first cyclone unit 200, in the height but lower. For the air to descend and form a rotary air current in first cyclone chamber 220, the air should be let in from the side of the upper part of first cyclone chamber 220. Accordingly, first inlet 240 of first cyclone chamber 220 is limitedly located. However, as illustrated, second inlet 340 of each of plurality of cyclones 310 is freely settable up to the height of first cyclone unit 200, regardless of the height of first inlet 240. According to an embodiment of the present invention, a part of the lower side of plurality of cyclones 310 is inserted into dust collecting unit 500. Likewise, the height of second inlet 340 is freely controlled according to the shape of a vacuum cleaner (not shown) having the multi cyclone dust separating apparatus 100 such as to maximize usable space. Vertical inducing part 423 mentioned later may be lengthened, thereby increasing a rotary force of the air and improving dust collection efficiencies.

Cover unit 400 comprises first cover 410 and second cover 440 formed at an upper part of first cover 410.

First cover 410 induces the air discharged from first cyclone unit 200 to respective plurality of cyclones 310 of the second cyclone unit. First cover 410 has a plate shaped cover body 411, an air guide path 420, and a discharge guide path 430. Mounted in a predetermined part of cover body 411 is a suction pipe route 412 corresponding to suction pipe 260 of first cyclone unit 200. Air guide path 420 includes both a horizontal inducing part 421 radially disposed with reference to the center of cover body 411, and a vertical inducing part 422 extending downwards for a predetermined length so that air guide path 420 has one end fluidly communicating with horizontal inducing part 421 and the other end fluidly communicating with the second inlet of each of the plurality of cyclones 310. It is exemplified that vertical inducing part 422 is substantially the same as suction pipe 260 in height.

Horizontal inducing part 421 guides air that is discharged from first cyclone 200 and first outlet 250 into vertical inducing part 422, while forming a rotary air current. Accordingly, the air soaring toward the center of cover body 411 moves to all sides, guided by cover body 411. Vertical inducing part 422 guides air that is drawn in through vertical inducing part 421 into each of the plurality of cyclones 310, thereby maintaining a rotary air current. Towards this goal, spiral air inducing member 423 is mounted inside vertical inducing part 422. Air inducing member 423 may be integrally formed with vertical inducing part 422. The air drawn in has an increased rotary force resulting in improved efficiencies of collection of minute dust particles. The lower side of vertical inducing part 422 is fluidly communicated to second inlet 340 of each of the plurality of cyclones 310. Discharge guide path 430 penetrates an inner part of vertical inducing part 422 of air guide path 420, and minute dust particles are centrifugally separated from second cyclone chamber 320 of the plurality of cyclones 310. The dust particles pass through discharge guide path 430 and are removed from the air. The cleaned air ascends again and flows out. It is exemplified that air inducing member 423 is formed at an inner side of vertical inducing part 422. A spiral air inducing member may be formed at an outer side of discharge guide path 430.

Second cover 440 covers first cover 410. Exhaust pipe 450 is formed at the upper part of second cover 440. Air that is discharged from each of the plurality of cyclones 310 is discharged through discharge path 430 and is exhausted out of multi cyclone dust separating apparatus 100. Exhaust pipe 450 may or may not be formed at the upper side of second cover 440. Exhaust pipe 450 may also be mounted on the side of second cover 440. First cover 410 and second cover 440 may be formed either integrally or separately.

Dust collecting unit 500 collects dust that is centrifugally separated from the air in the first and second cyclone unit 200, 300. Dust collecting unit 500 has the upper end open and the lower end closed. Dust collecting unit 500 is detachably formed at the lower side of cyclone unit 110 so that the collected dust may be easily removed. Dust collecting unit 500 comprises dust collecting body 510, first dust collecting part 520 which collects dust centrifugally separated from first cyclone unit 200, second dust collecting part 530 which collects dust centrifugally separated from each of the plurality of cyclones 310 of second cyclone unit 300, and partition 540 which separates first dust collecting part 520 and second dust collecting part 530. Pillar 511 protrudes from the bottom of dust collecting body 510. Pillar 511 prevents dust collected at first dust collecting part 520 from ascending on a rotary air current. Separation member 512 connects pillar 511 and an inner wall of dust collecting body 510 and prevents dust from being rotated by a rotary current or moved.

Hereinafter, described is an operation of a multi cyclone dust separating apparatus 100 with the above structures according to an embodiment of the prevent invention.

A suction pipe 260 lets in dust entrained air which goes through first inlet 240 and flows into first cyclone chamber 220. The air forms a rotary air current and descends. Relatively large dust particles in the air are centrifugally separated, descend and are collected at first dust collecting part 520 of dust collecting unit 500. The filtered air ascends through grill member 270 and flows out first outlet 250. Dust particles larger than the minute holes of grill member 270 fail to flow into grill member 270 and are filtered. The air ascending through first outlet 250 collides with first cover 410 and spreads. The air goes through horizontal inducing part 421 and vertical inducing part 422 and flows into second cyclone chamber 320 through second inlet 340. The air that is drawn in forms a rotary air current by the structure of air guide path 420 and is separated into minute dusts and non-minute dusts at second cyclone chamber 320. That is, the drawn in air descends, forming a rotary air current. The minute dust particles not yet separated from first cyclone unit 300, are centrifugally separated, descend and are collected in the second dust collecting part 530 of dust collecting unit 500. Dust detrained air passes through discharge guide path 430 and the air is discharged from discharge guide path 430 gathers together and flows out of the multi cyclone dust separating apparatus 100 through the suction pipe 450 of the second cover 440. Suction pipe 450 may have a connected driving motor (not shown) that provides a suction force either directly or indirectly.

FIGS. 3 and 4 are a separated perspective diagram and a sectional view of a multi cyclone dust separating apparatus according to another embodiment of the present invention. The multi cyclone dust separating apparatus 100' according to an embodiment of the present invention comprises: cyclone unit 110' having first cyclone unit 200' and second cyclone unit 300'; cover unit 400' which is connected to an upper part of cyclone unit 110' and has first cover 410' and second cover 440'; and dust collecting unit connected to a lower side of cyclone unit 110'.

Likewise, second inlet 340' of the plurality of cyclones 310' is shorter first inlet 240' of first cyclone unit 200'. Second cyclone unit 300' is completely inserted into second dust colleting part 530' of dust collecting unit 500'. That is, second inlet 340' of each of the plurality of cyclones 310' is located in an upper part of dust collecting body 510'.

First cyclone unit 200' does not have housing 210 (refer to FIG. 1) installed. Cover body 411' of first cover 410' completely covers first chamber outer wall 230' of first cyclone unit 200'. Installed in a predetermined part of cover body 411' is suction pipe path 412' corresponding to suction pipe 260' of first cyclone unit 200'.

Cover body 411' of first cover 410' is substantially as tall as first chamber outer wall 230'. Vertical inducing part 422' of air guide path 420' is as tall as first chamber outer wall 230' corresponding to cover body 411'.

Dust collecting body 510' of dust collecting unit 500' is connected to the lower side of cover body 411' of first cover 410' and partition 540' is connected to the lower side of first chamber outer wall 230' of first cyclone unit 200'.

According to an embodiment of the present invention, it is exemplified that second cyclone unit 300' is completely inserted into dust collecting unit 500'. However, the present invention is not defined as the appended claim but as abovementioned in a prior embodiment of the present invention, a part of the lower end of second cyclone unit 300', or equal to or more than half of second cyclone unit 300' may be inserted at dust collecting unit 500'. Accordingly, second inlet 340' of each of the plurality of cyclones 300' varies in height. Likewise, the height of second inlet 340' is freely controlled according to a variety of shapes of the multi cyclone dust separating apparatus and the dust collecting unit, such that the degree of design freedom of the multi cyclone dust separating apparatus 100' and a vacuum cleaner (not shown) is enhanced. Accordingly maximized is space usability.

According to an embodiment of the present invention, the multi cyclone dust separating apparatus with the above structures may be selectively employed for various forms of cleaners (for example, an upright type or a canister type vacuum cleaner).

As abovementioned, according to an embodiment of the present invention, the cyclone dust separating apparatus sequentially separates dust and increases rotary force of the air drawn into the second cyclones, such that minute dust particles in the air can be effectively separated and, thus, the collecting efficiency is enhanced.

The inlet of the first cyclone and the inlets of the plurality of the second cyclones have different heights. The inlets of the second cyclones can be varied in height according to the vacuum cleaner shape and the dust collecting unit shape. This results in an increased degree of freedom of the multi cyclone dust separating apparatus and a maximization of the space usability of the vacuum cleaner. By controlling the heights of the first and second cyclones, the size of the multi cyclone dust separating apparatus is compacted.

While the invention has been shown and described with reference to certain embodiments thereof, it will be understood by those skilled in the art that various changes in form and details may be made therein without departing from the spirit and scope of the invention as defined by the appended claims.

What is claimed is:

1. A multi cyclone dust separating apparatus, comprising:
   a first cyclone unit comprising a housing, a first cyclone chamber centrifugally separating dust from air, a chamber outer wall forming the first cyclone chamber, a first inlet and a first outlet;
   a second cyclone unit comprising a plurality of cyclones arranged along an inner circumference of the housing such that minute dust is centrifugally separated from air that is drawn in from the first cyclone unit, and each one of the plurality of cyclones comprises a second cyclone chamber, a second chamber outer wall forming the second cyclone chamber, a second inlet, and a second outlet;
   a cover unit mounted at upper sides of the first and second cyclone units, in which the air that is discharged from the first cyclone unit is guided into the second cyclone unit, and the air that is discharged from the second cyclone unit is discharged to the outside; and
   a dust collecting unit that collects dust that is separated from the air in the first and second cyclone units,
   wherein the second inlet of each one of the plurality of cyclones of the second cyclone unit is lower than the first inlet of the first cyclone unit.

2. The multi cyclone dust separating apparatus of claim 1, wherein the plurality of cyclones comprises at least one cyclone of the second cyclone unit that is inserted into the dust collecting unit.

3. The multi cyclone dust separating apparatus of claim 1, wherein the plurality of cyclones comprises at least one cyclone of the second cyclone unit that is completely inserted into an inside of the dust collecting unit.

4. The multi cyclone dust separating apparatus of claim 2, wherein the cover unit comprises:
   a first cover having an air guide path allowing and rotarily inducing the air discharged from the first outlet of the first cyclone unit to each of the second inlets of the plurality of cyclones, and an outlet guide path to be fluidly communicated with each of the second outlets of the plurality of cyclones; and
   a second cover combined to cover the first cover and having a discharge pipe combining air exhausted from each of the outlet guide paths and externally discharging the combined air.

5. The multi cyclone dust separating apparatus of claim 4, wherein the air guide path has horizontal parts radially disposed with reference to a center of the first cover, and vertical parts extended downwards by a predetermined length, such that one end is fluidly communicated to the horizontal parts and the other end is fluidly communicated to the second inlet of the respective cyclone of the plurality of cyclones.

6. The multi cyclone dust separating apparatus of claim 5, wherein the outlet guide path penetrates through an inside of the vertical parts of the air guide path.

7. The multi cyclone dust separating apparatus of claim 6, further comprising an air inducing member inside the vertical parts, the air inducing member helping the air let in through the horizontal parts to descend, while maintaining a rotary current to advance the air into the second inlet of the plurality of cyclones.

8. The multi cyclone dust separating apparatus of claim 6, further comprising an air inducing member that is mounted on an outer circumference of the outlet guide path.

* * * * *